Nov. 18, 1941.     B. E. GETCHELL     2,263,208
AUTOMATIC ELECTRIC SWITCH
Filed Dec. 2, 1939     6 Sheets-Sheet 1
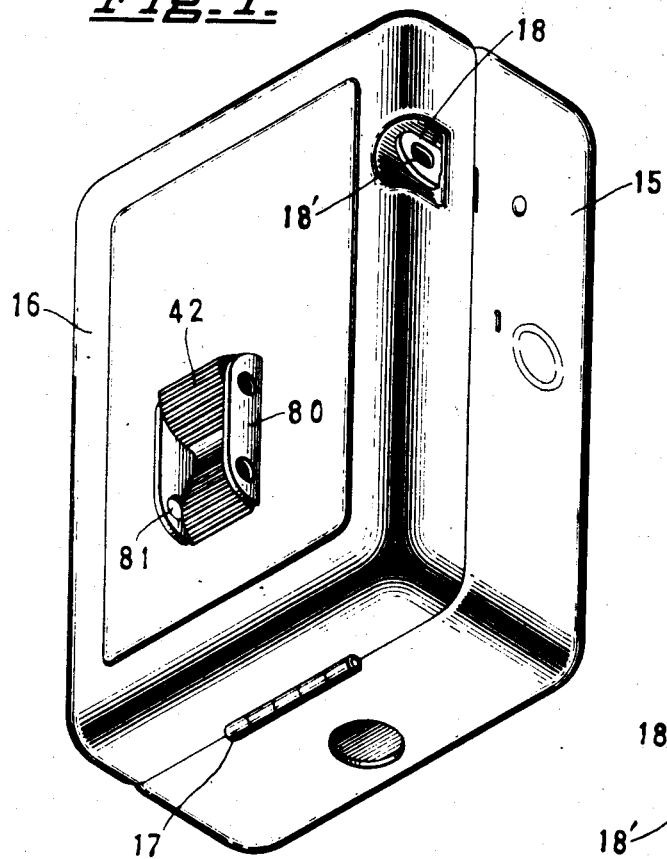
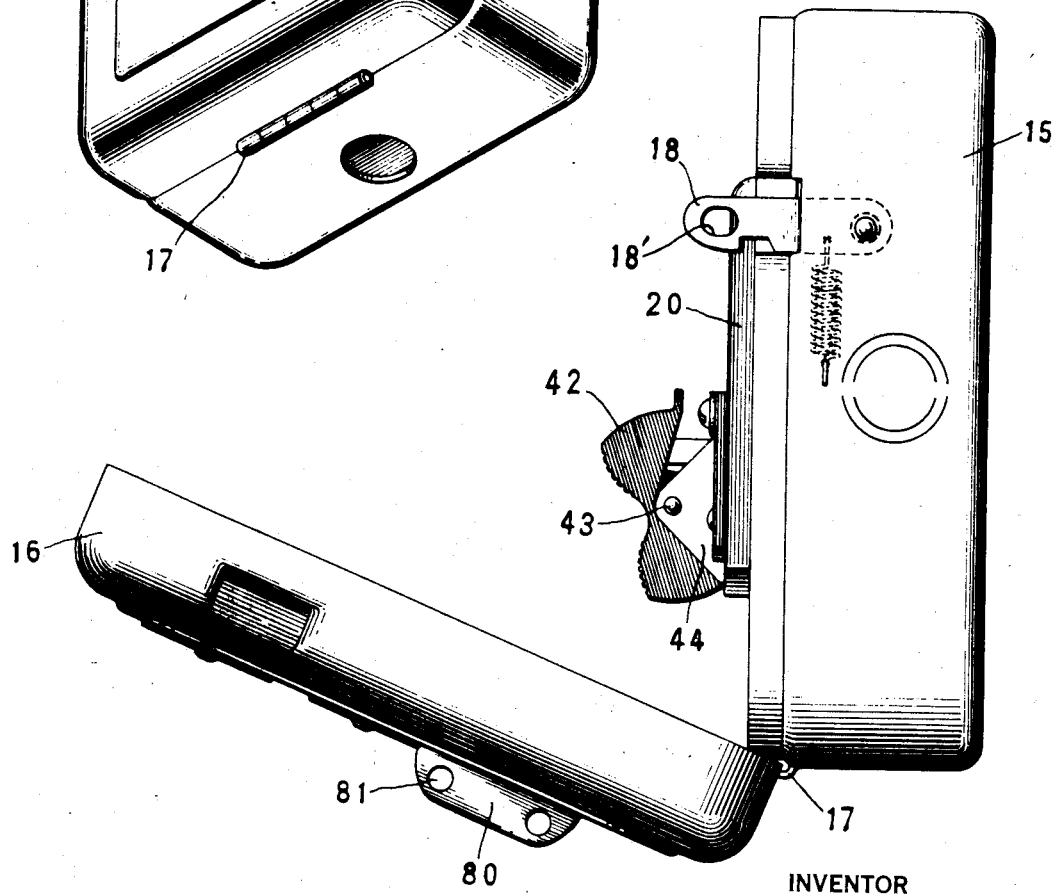
INVENTOR
BENJAMIN E. GETCHELL,
BY
ATTORNEY

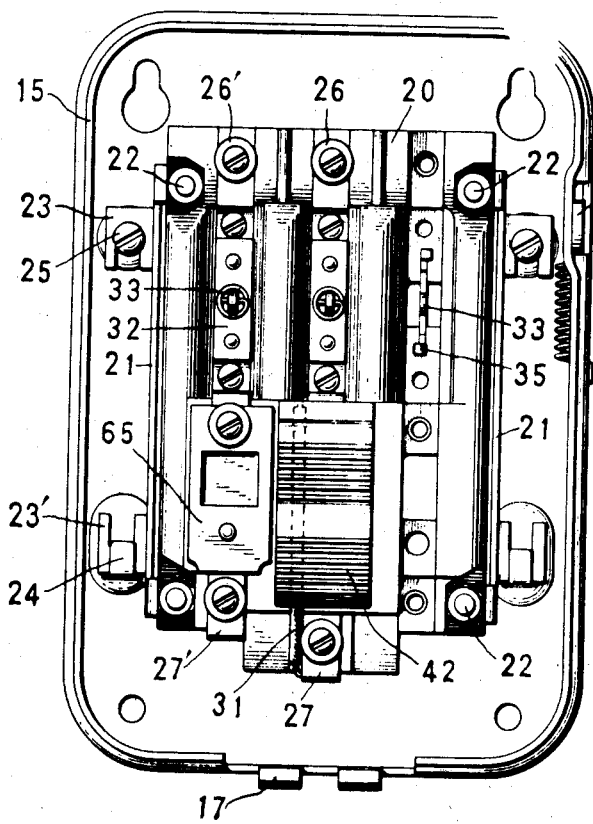
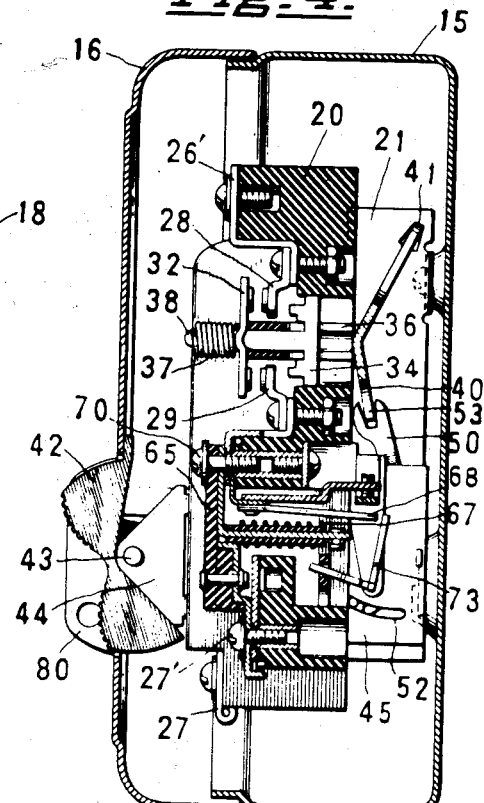
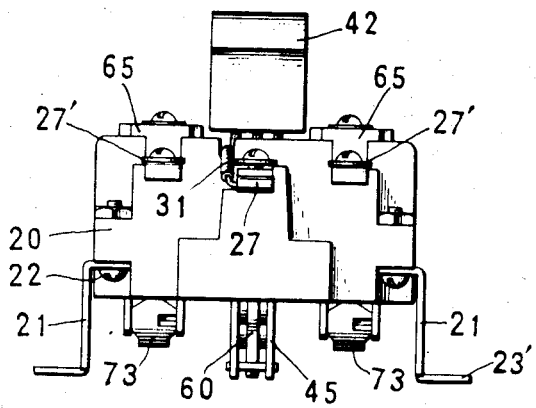
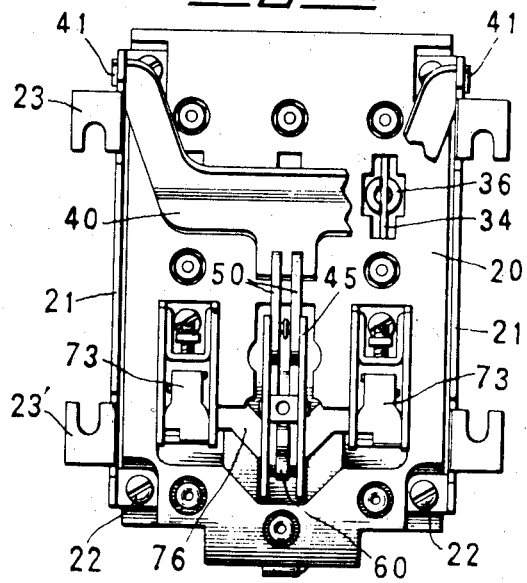

Nov. 18, 1941.    B. E. GETCHELL    2,263,208
AUTOMATIC ELECTRIC SWITCH
Filed Dec. 2, 1939    6 Sheets-Sheet 3

INVENTOR
BENJAMIN E. GETCHELL,
BY
ATTORNEY

Nov. 18, 1941.          B. E. GETCHELL                 2,263,208
                    AUTOMATIC ELECTRIC SWITCH
              Filed Dec. 2, 1939            6 Sheets-Sheet 4
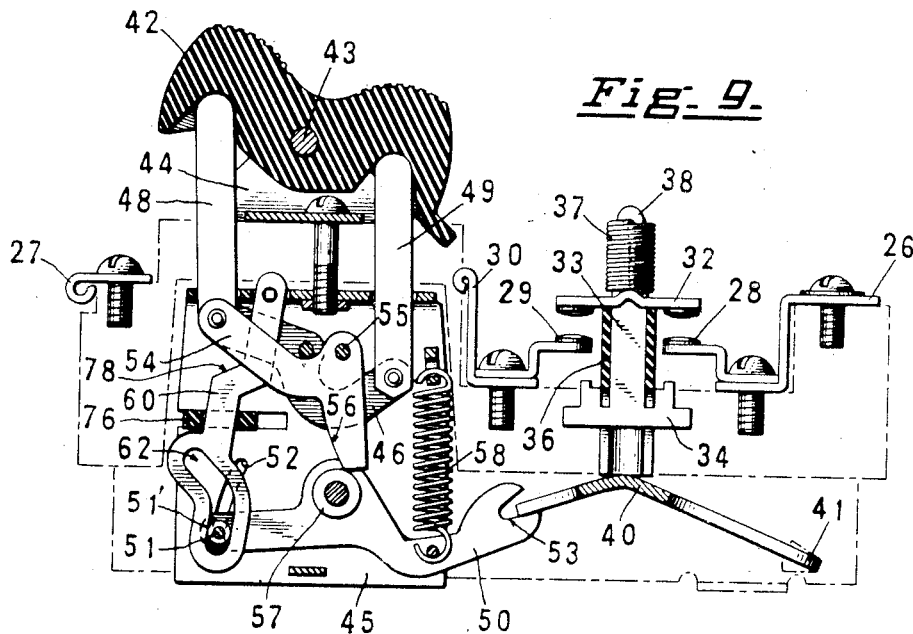

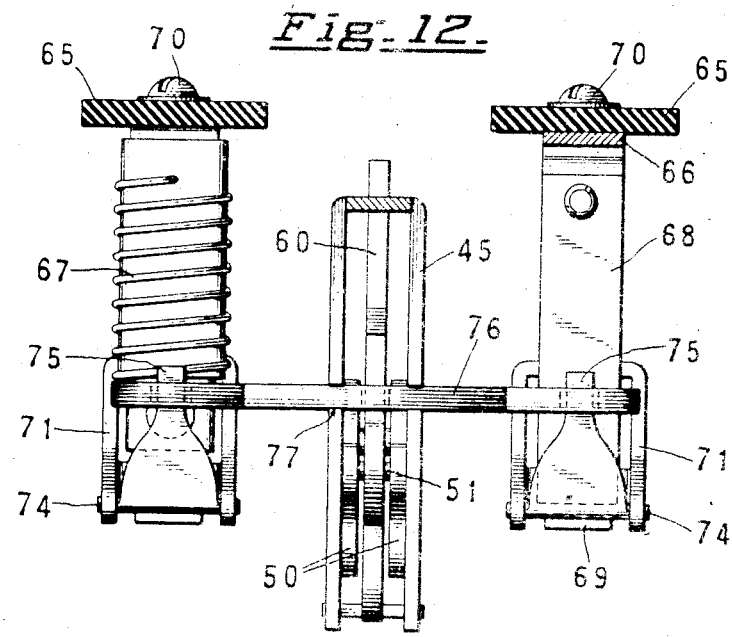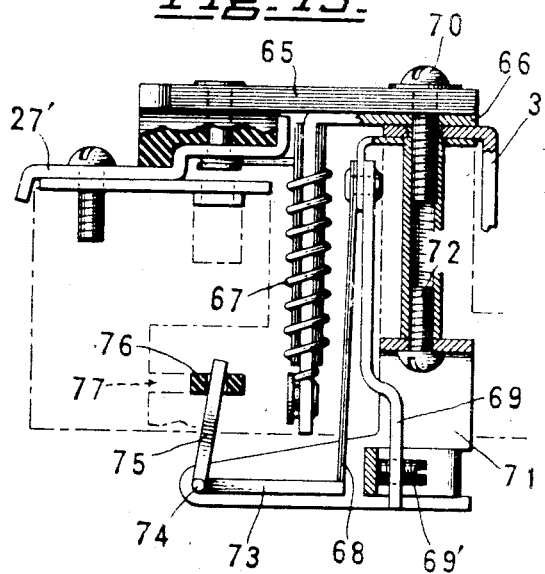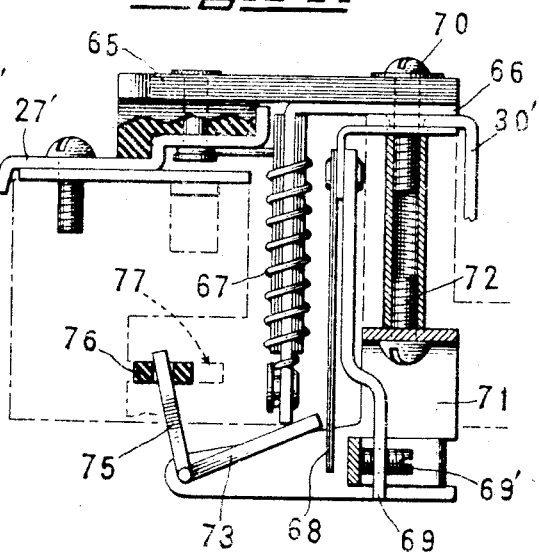

INVENTOR
BENJAMIN E. GETCHELL

Patented Nov. 18, 1941

2,263,208

UNITED STATES PATENT OFFICE 2,263,208

AUTOMATIC ELECTRIC SWITCH

Benjamin E. Getchell, Plainville, Conn., assignor to The Trumbull Electric Manufacturing Company, Plainville, Conn., a corporation of Connecticut Application December 2, 1939, Serial No. 307,195

14 Claims. (Cl. 200—116)

My invention relates to switches of the so-called secondary circuit breaker type which can be readily operated by hand and which will trip automatically to open the circuit in case of an overload. It relates especially to multi-pole devices with automatic tripping on either one or two poles.

One object of the invention is to provide a rugged but reliable construction for multiple pole control.

Another object is to provide a construction of this character which is ordinarily returned to a normal "off" position when tripped automatically but which can be reset by hand in case of failure to automatically return.

Another object is to provide a circuit breaker which cannot be held closed during continuance of an overload condition.

Another object is to provide a multiple switch requiring a minimum number of springs.

Another object is to improve details such as the switch contact carriers, the tripping mechanism, and the actuating device.

Another object is to provide means for conveniently mounting such a circuit breaker in a box.

Fig. 1 is a perspective view of an enclosed switch embodying my invention.

Fig. 2 is a side view showing the cover partially opened.

Fig. 3 is a front view of the box and switch, the cover and some of the conducting members being omitted.

Fig. 4 is a vertical section and side view of the construction, the section being taken along one of the side units and showing an overload release device.

Fig. 5 is an end view of the switch base and attached parts.

Fig. 6 is a rear view, parts being broken away.

Fig. 9 is a similar view showing parts in momentary intermediate position after automatic tripping and the circuit open.

Fig. 10 is an exploded perspective view of parts of the lever action.

Fig. 11 is a rear view of parts of the overload release device in the position they occupy when one release device has been tripped.

Fig. 12 is an end view of the two overload release devices and showing the connection with the lever action.

Figs. 13 and 14 are detail side views of a thermostatic release device latched and tripped respectively.

Figure 7:
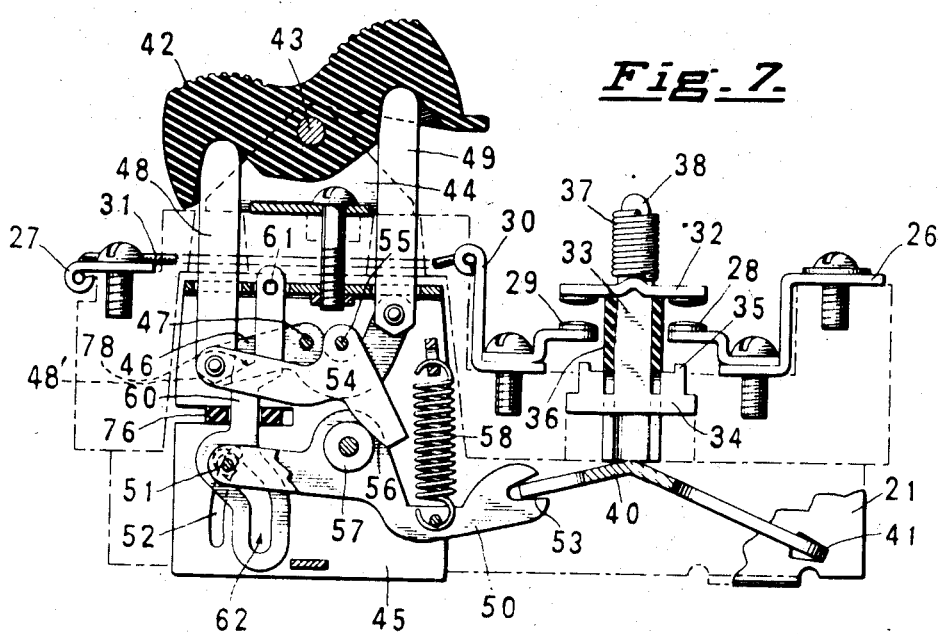
Fig. 7 is a skeleton side view showing the parts of the central unit and main lever action in the normal open circuit or "off" position.

The mechanism is especially intended for embodiment in a suitable box having a body 15 and a cover 16 hinged at 17. A spring pressed latch 18 serves to hold the cover closed.

The conducting parts are all carried by an insulating base 20 which may have side supporting frames 21 and secured to it at both ends by screws or bolts 22. Each frame 21 has an ear or lug 23, 23' at each end for securing it and the base to the bottom of the box. Hooks 24 are arranged in the bottom of the box to receive beneath them the lower ears 23'. The upper ears 23 are slotted to receive the shanks of clamp screws 25 which have threaded seats in the bottom of the box. For convenience in manufacture and assembly, the two side frames and their attached ears are interchangeable.

The preferred form embodies three switch contact units for a three wire installation. The circuit making and breaking contacts are all alike. The central unit need have no protective device but each of the outer units has a thermostatic overload release device. The center switch unit has terminals 26 and 27 and the side units terminals 26' and 27'. Each unit has a pair of stationary contacts 28, 29 suitably secured to the insulating base. A conductor strap 30 connected to contact 29 projects up to about the level of the terminal 27 to which it is connected by a conductor 31. Each unit has a movable switch contact 32 slidably mounted on a stationary post 33 which is mounted in the base by being thrust forward from the back and having prongs 35 on its foot bent over at the front to hold the post in place. An insulating tube 36 is slidably fitted over the post and has its lower end split to allow clearance for the foot 34 of the post. Above this is mounted the movable contact 32. A spring 37 is slipped over the outer end of the post and compressed until the outer cross piece of the spring can be twisted into engagement with the hook 38 at the end of the post, the inner end of the spring pressing against the contact 32. This arrangement involves individual and independent mounting of the contacts, allowing each to close itself entirely by its own spring pressure, without need to overcome friction of the other contacts.

A yoke member 40 is hinged at 41 in the side frames beneath the base and has a bar which extends across beneath all of the insulating tubes 36. The movement of this yoke member governs the position of all three of the switch units.

A finger piece 42 is hinged at 43 to a support 44 which is mounted on the insulating base. The screw securing support 44 to the insulating base also secures the mechanism frame 45 to the under side of the base. A rocker 46 hinged at 47 has its opposite ends connected to the finger piece by the plungers 48 and 49 between the side plates of the frame 45.

A floating arm or lever 50 has a pin 51 at one end slidably supported in a slot 52 in the frame. The other end is forked at 53 to engage the contact controlling yoke 40.

A so-called cam lever 54 is hinged at 55 and has one end hinged to the link or plunger 48. This lever 54 has a cam-like member 56 adapted to engage a roller 57 carried by the floating lever 50. The lever 50 may have two spaced parts between which the roller 57 is mounted. A spring 58 is connected to the lever 50 and to the frame 45 so as to bias the lever 50 always towards the "off" position of Fig. 7.

A latch member 60 is hinged at 61 at its outer end and has a forked slot 62 at its inner end in which the pin 51 slides. A roller bearing 51' (Fig. 10) may be provided if desired. It may be noted here that the pin 51 cannot slide downward beyond the angle in slot 62 unless the member 60 is pivoted to a position in which the lower part of the slot aligns with the slots 52 in the frame pieces 45, as in Figure 9. When the lower ends of the slots 62 and 52 are in diverging positions, as in Figures 7 and 8, pin 51 will not be permitted to slide in the slots to any substantial degree.

The overload release for each side unit embodies a thermostatic arm and a heater for instance as shown and claimed in my Patents Nos. 1,886,477 and 1,996,720.

The insulating body 65 carries the angular post 66, one end of which engages the outer end 30' of a contact terminal. A heater coil 67 has one end connected to the inner end of conductor 66 and the other end connected to the terminal 27'. The bimetal strip 68 has one end carried by the bar 69 which can be adjusted by turning the screw 69'. The heater device may be secured in place by a screw 70. A bracket 71 secured by screw 72 carries the latch 73 pivoted at 74. This latch has a projecting tongue 75.

The two latches at opposite sides support preferably at least in part a trigger bar or cross bar 76 which is partly guided in a slot 77 in the frame 45. This bar is preferably of insulating material. The latch 60 extends loosely through the trigger bar 76. The cross bar is thus provided with three bearing points, the two latches 73 at each end, and the latch bar 60 in the center. If either latch is released the cross bar will pivot about the other latch and the latch bar 60 a sufficient extent to release the support for the latch bar. If both latches are released together, both ends of the cross bar are allowed to move and release the support for latch bar 60 without pivoting of the cross bar. Thus the cross bar may be said to "float." The release of either end of the cross bar is entirely independent of the position of the other end and causes no difference in the power necessary to operate either one end alone or both together. The latch bar has a shoulder 78 which may be engaged by the slanting surface 48' of a plunger 48 in returning the parts to "off" position after an automatic release in case the latch bar does not happen to go all the way back to the proper reset position.

Figure 8:
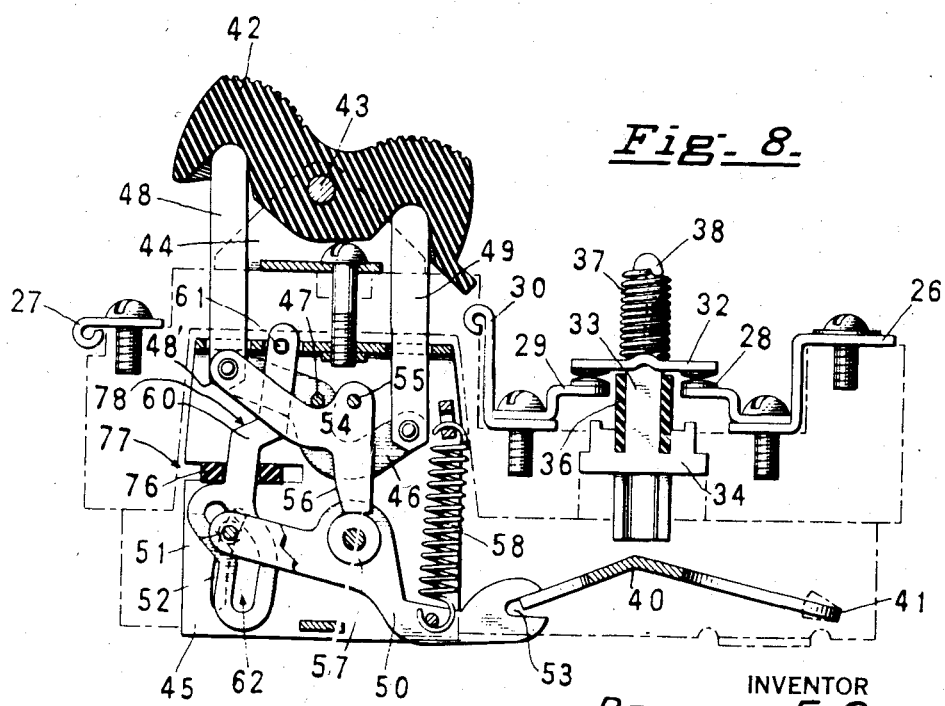
Fig. 8 is a similar view showing the parts in the normal closed circuit or "on" position.

As shown in Fig. 4 and Fig. 7, when the parts are in "off" position (which is also the final position in automatic tripping) the latch bar 60 moves the center of cross bar 76 away from its tripped position and beyond the normal "on" position. This moves the ends of the cross bar and the latches 73 to reset the latches if either one is tripped. When they are engaged with their thermostats, the latches 73 bear on the cross bar in one direction, supporting the cross bar against movement by the latch bar, which bears in an opposite direction. Because these two points bearing in one direction resist the force of another point bearing in the opposite direction, the release of either or both of the two points permits sufficient movement of the single point to trip the switch mechanism.

Figure 15:
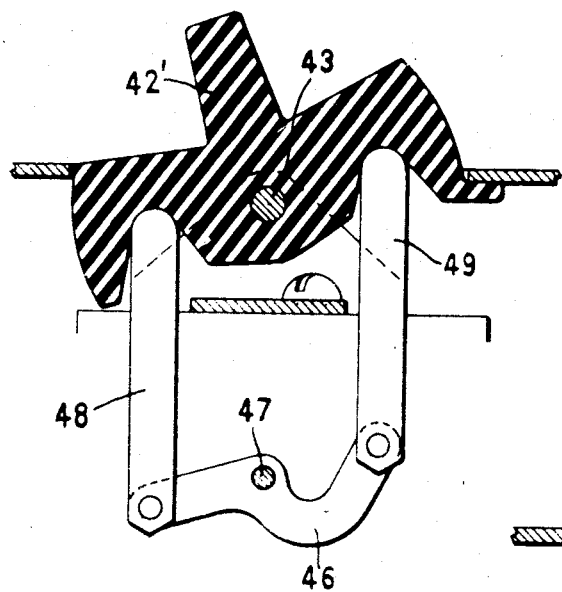
Fig. 15 is a section and side view showing a somewhat different form of actuating lever.
Figure 16:
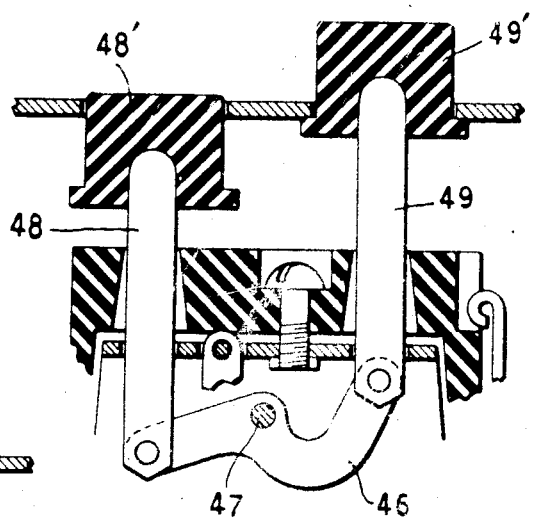
Fig. 16 is a section and side view showing two separate actuator buttons in place of the tilting actuator.

The cover is designed for a tilting finger piece 42 and has flanges 80 with holes 81 for a padlock or other means for preventing operation of the switch. A projecting operating lever 42' such as shown in Fig. 15 or in my Patent No. 1,996,720 may be employed if desired. The latch 18 may have an opening 18' (Fig. 2) for a lock or sealing device if desired to prevent opening the cover. If preferred, push buttons 48' and 49' may be fastened directly to the ends of the plungers 48 and 49 in place of the finger piece 42 for standard push button operation as shown in Fig. 16.

The switch may be manually operated to open or close the circuit by simply tilting the finger piece 42 in the proper direction. Fig. 7 shows the switch open. To close the circuit the piece 42 is tilted to the position of Fig. 8. In this operation, the rocker 46 tilts in the same direction as the finger piece and the cam lever 54 tilts likewise, the cam portion 56 pressing against the roller 57 carried by the floating lever 50. As the pin 51 is held by the walls of the stationary slot 52 in the frame and by the latch bar 60 (which is held by trigger bar 76), the lever 50 can only tilt about the pin 51 as a pivot to the position of Fig. 8, thus retracting the yoke 40 from beneath the switch supports 36 and allowing the springs 37 to force the switch members 32 against the stationary contacts 28, 29. Cam 56 of lever 54 is carried over the center of roller 57 so that the opening tension of spring 58, exerted on floating lever 50, locks cam 56 and roller 57 into "on" position.

To open the circuit the finger piece 42 is tilted back to the position of Fig. 7. As soon as the tip of the cam 56 moves from the roller 57, the spring 58 serves to move the lever 50 quickly and thus cause the yoke 40 to strike beneath the plungers 36 and thus raise all the contacts 32 and open the circuit.

The spring 58 tends to tilt the lever 50 about the tip of the cam 56 and thus press the pin 51 against the wall of the slot 62 in the latch bar 60. The latch bar in turn is pressed by this same spring action against the trigger bar 76 which in turn is held by the action of the two latches 73.

When the circuit is closed, if an overload occurs in one branch of the circuit its heater 67 will heat the adjacent bimetal strip 68 and thus disengage it from the latch 73. This releases the trigger bar 76 so that the latch bar 60 can move to release pin 51 and permit the lever 50 to move as guided by the slot 52. This permits the spring 58 to tilt the lever 50 so that the jaws 53 will move upward and cause yoke 40 to open the switch contacts as is shown in Fig. 9. The floating lever, when tilted in this fashion, is retracted by the guiding movement of pin 51 in slots 52, putting the roller 57 on the other side or incline of the cam 56. This throws roller 57 to the left of the cam 56 and permits spring 58 to again move floating lever 50, which is now pivoted at 53 on yoke 40, in a further upward movement, forcing lever 54 into position shown in Fig. 7. The end of floating lever carrying pin 51 is also drawn to the top of slot 52 which restores latch bar 60, trigger bar 76, and latches 73 to the normal "off" position as shown in Figs. 4 and 7. The same release action will take place promptly upon an overload in either or both of the side branches of the circuit. If the actuating member is manually held in the "on" position against an overload, the parts will take the intermediate position shown in Fig. 9, and upon release of manual pressure, the spring will cause the parts to return to the position of Fig. 7.

Figure 17:
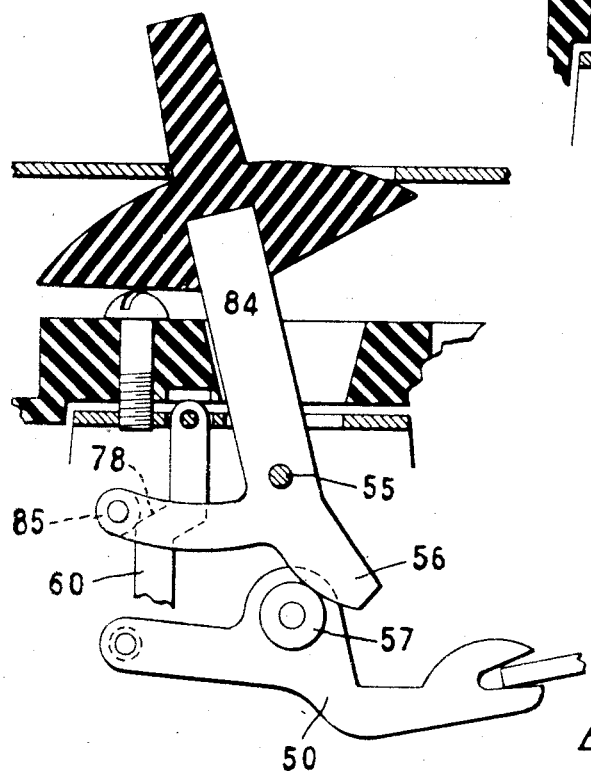
Fig. 17 is a section and side view of still another actuating arrangement.

In the construction shown in Fig. 17, the push rods 48 and 49 and the rocker 46 are omitted and in their place is a single lever 84 pivoted at 55 and having a cam extension 56 for engaging the roller 57 on the floating lever 50. This lever 84 has a roller 85 coacting with the incline 78 on the latch bar 60 to provide a positive reset. The action will be understood from the analogy to the mechanism already described.

Other changes may be made within the scope of my invention.

I claim:

1. In a switch, a spring pressed contact, a floating lever spring pressed to retract said contact against the bias of its spring, a hinged latch bar having a pin and slot connection with said floating lever, guiding means for the end of the lever adjacent the slot, means for tilting said lever, a trigger bar controlling said latch bar, a hinged latch restraining said trigger bar and means actuated by overload to release said latch.

2. In a switch, a stationary guide post having a hook at its end, a switch member slidable on said post and a helical spring on said post and having one end bent radially and directly interlocked with the hooked end of the post for holding the switch member on the post and for moving said member into circuit closing position.

3. In a switch, stationary contacts, a post between said contacts, an insulating tube slidable on said post between said contacts, a movable switch member slidable on said post, a spring on said post pressing said switch member toward said contacts, said switch member being retractable by said tube.

4. A switch including two discrete contact devices, means for simultaneously actuating said contact devices including a floating lever and a pivoted intermediate lever, said levers having a cam-like connection, a latch member coacting with the floating lever, said latch member and floating lever having a pin and angular slot connection, a thermostatically actuated release device in circuit with each contact device and a tilting trigger bar coacting with each release device and with said latch member.

5. In a switch, stationary contacts, a post between said contacts, an insulating tube slidable on said post between said contacts, a movable switch member on said tube and retractable thereby, a spring on said post pressing said switch member toward said contacts and mechanism for sliding said tube to retract said movable switch member including a floating lever adapted to actuate said tube and a plunger device operatively connected to said lever for actuating the same.

6. In an electric switch, an insulating base having a passage, a stationary contact supporting post of an inverted T-shape with the tips of its cross piece bent over and fixed in the insulation from the rear and its stem projecting through said passage for supporting a contact adapted to move relative to said stem and a spiral spring around said stem and having one of its ends anchored directly to said stem and its other end pressing against the movable contact on the stem.

7. A three pole switch having means for manually operating the switch to control all three poles including a main latch member, an overload release device in each of two poles and means for permitting the devices to operate independently of each other without causing any difference in the power necessary to operate either one alone or both together including a trigger bar interlocked at its center with said latch member, spring means pressing said bar in one direction and a pivoted latch member at each end of said bar controlled by one of said release devices and pressing said bar in the opposite direction whereby when one of said end latch members is released said bar is moved by said central latch member around the other end latch member and manually operable means for actuating said switch to close the circuit simultaneously in all three poles including a floating lever having a sliding connection with said main latch member.

8. A switch including a frame having a slot, stationary contacts, movable contacts, means for moving said movable contacts to "on" position, means for holding said movable contacts in "off" position including a floating lever having a pin at one end slidable in said slot, a spring for moving said floating lever and operative means of connection between the lever and movable contacts and means for permitting movement of said movable contacts to "on" position including a manually operated plunger, a lever connected to said plunger and adapted to move said floating lever, means for holding one end of said floating lever against movement including a latch member having a slotted portion adapted to receive said pin when said slotted portion is in alignment with the slot in said frame and adapted to interlock with said pin when out of alignment, thermostatically controlled means for holding said slots out of alignment and means for moving the slotted portion of said latch member into alignment with the slot in the frame upon release of said thermostatically controlled means to permit free movement of the pin and floating lever.

9. A switch including a frame having a slot, stationary contacts, movable contacts, means for moving said movable contacts into "on" position, means for holding said movable contacts in "off" position including a floating lever having a pin at one end slidable in said slot, a spring for moving said floating lever and operative means of connection between the lever and movable contacts, means for permitting movement of said movable contacts into "on" position including a manually operated plunger, a lever connected to said plunger and adapted to move said floating lever, means for holding one end of said floating lever against movement including a latch member having a slotted portion adapted to receive said pin when said slotted portion is in alignment with the slot in said frame and adapted to interlock with said pin when out of alignment, thermostatically controlled means for holding said slots out of alignment including a trigger bar operatively connected at its center to said latch member and means for permitting movement of said trigger bar whereby said slotted portion of the latch member may be moved into alignment with the slot in the frame upon release of the thermostatically controlled means to permit free movement of the pin and floating lever.

10. A switch including a frame having a slot, stationary contacts, movable contacts, spring means for moving said movable contacts into "on" position, means for moving said movable contacts to "off" position, including a floating lever, a pin at one end of said lever slidable in said slot, a spring for moving said lever to "off" position, a latch member having a slotted portion adapted to receive said pin and hold it against movement and thermostatically controlled means for moving said latch member to inoperative position including a trigger bar interlocked with said latch member at its center and being pressed by said latch member in one direction, pivoted members at the ends of the trigger bar pressing against said trigger bar in an opposite direction whereby when either end latch member is released said trigger bar pivots around the other end latch member and moves the latch member with its slotted portion into alignment with the slot in the frame to permit said pin to ride in the aligned slots.

11. In a multiple switch, a circuit breaker comprising stationary contacts, movable contacts always biased toward engagement with said stationary contacts, manually movable means including a pivoted lever for controlling movement of said contacts into and out of engagement, a floating actuating lever between said manual member and said movable contacts and having a pivotal connection with said pivoted lever, spring means always biasing said floating lever toward said pivoted lever and said movable contacts, a latch member movable in response to the effect of an overload current to release said floating lever, said latch member acting as a support for said floating lever whereby said floating lever pivots about its point of engagement with said latch member during manual engagement and disengagement of said contacts, said floating lever rotating about its point of pivotal engagement with said pivoted lever upon overload release of said latch member.

12. In a switch, a frame having a slot, a stationary contact, a plunger member, a switch member carried by said plunger for engagement with said stationary contact, a spring biasing said plunger to closed circuit position, a bar movable in the path of said plunger, a floating lever having one end interlocked with said bar to move and hold said bar in open circuit position and having a pin at its opposite end movable in said slot to guide the movement of the lever, a spring for automatically moving the interlocked end to cause movement of the bar, a manually operable lever for moving the floating lever and connected bar away from the plunger, mechanism for holding the lever and bar away from the plunger including a pivoted latch member having a shouldered slot biased to move into alignment with the slot in the frame to permit movement of the pin in the aligned slots, mechanism to prevent movement of said latch to slot aligning position including a trigger bar interlocked at its center with said latch member and being pressed by said latch member in one direction, and pivoted latch members at the ends of said trigger bar pressing against said bar in the opposite direction and thermostatic means for releasing one or both of said end latch members to permit pivotal movement of the trigger bar and release of the slotted pivoted latch member.

13. A multipolar automatic trip switch including a plurality of contacts, mechanism for normally opening and closing the contacts, a central latch member for rendering said mechanism inoperative so that all of the contacts will open under abnormal conditions, a trigger bar pivoted adjacent its center to said central latch member and being normally pressed by said latch member in one direction, an end latch member at each end of the trigger bar normally pressing against said trigger bar in opposite directions, whereby when either end latch member is released said trigger bar pivots around the other end latch member and permits movement of the central latch member into inoperative position for opening the contacts, and means for independently releasing each end latch member upon a condition abnormal to one pole of a circuit through the switch.

14. In a circuit breaker, two spaced apart movable switch members arranged to operate in directions which are parallel to each other, a pivoted yoke member adapted to operate both of said switch members, a floating lever having one end coacting with said yoke, guiding means for the other end of said lever, a latch member pivoted at one end and having a sliding connection at its other end with said floating lever, manually operable means including a pivoted arm having a cam action connection with a portion of the floating lever intermediate its ends actuating said floating lever and said switch members to close the circuits through said switch members, a transverse trigger bar connected at its central portion with said latch member and means actuated by an overload through each of said switch members for moving the ends of said trigger bar and actuating the same to release said latch member.

BENJAMIN E. GETCHELL.